(12) United States Patent
Fujitani et al.

(10) Patent No.: US 6,394,825 B1
(45) Date of Patent: May 28, 2002

(54) CONNECTOR BLOCK FOR INJECTORS

(75) Inventors: Mitsuhiro Fujitani, Yokkaichi; Masaki Akutagawa, Chiryu; Masahiro Takeda, Toyoake, all of (JP)

(73) Assignees: Sumitomo Wiring Systems, Ltd., Mie; Denso Corporation, Kariya, both of (JP)

( * ) Notice: Subject to any disclaimer, the term of this patent is extended or adjusted under 35 U.S.C. 154(b) by 0 days.

(21) Appl. No.: 09/576,432

(22) Filed: May 22, 2000

(30) Foreign Application Priority Data

May 31, 1999 (JP) .......................................... 11-152598

(51) Int. Cl.[7] .................................................. H01R 13/44
(52) U.S. Cl. ........................ 439/130; 123/468; 123/456
(58) Field of Search ............................... 123/468–470, 123/456, 736; 439/130

(56) References Cited

U.S. PATENT DOCUMENTS

| | | |
|---|---|---|
| 4,570,601 A | 2/1986 | Ito et al. |
| 4,844,036 A * | 7/1989 | Bassler et al. ............. 439/130 |
| 5,598,824 A * | 2/1997 | Treusch et al. ............. 439/130 |
| 5,616,037 A * | 4/1997 | Lorraine et al. ............ 439/130 |

FOREIGN PATENT DOCUMENTS

| | | |
|---|---|---|
| JP | A-6-10789 | 1/1994 |
| JP | A-8-284773 | 10/1996 |
| JP | A-9-217661 | 8/1997 |
| JP | A-9-310662 | 12/1997 |

* cited by examiner

Primary Examiner—Gary Paumen
(74) Attorney, Agent, or Firm—Oliff & Berridge, PLC

(57) ABSTRACT

In molding a connector block 1 for injectors including a fuel passage 3 integrally formed, a fuel rail 4 including the fuel passage 3 is advancedly formed by a first molding. The fuel rail 4 is provided with a plurality of positioning projections 7 with respect to metal molds for a secondary molding in a longitudinal direction. The fuel rail 4 is set in a position and placed in the metal molds. When the secondary molding is conducted in this state, the fuel rail 4 will not be subjected a positional displacement, but can be accurately molded.

3 Claims, 8 Drawing Sheets

CONNECTOR BLOCK FOR INJECTORS

BACKGROUND OF THE INVENTION

1. Field of the Invention

The present invention relates to a connector block for electric power feed to injectors (fuel injection valves) in an internal combustion engine for use in an automobile or the like, and more particularly to the connector block of a type in which fuel passages are integrally incorporated.

2. Description of the Related Art

Conventionally, there has been known an internal combustion engine in which fuel is supplied to a plurality of cylinders by means of respective electromagnetic injectors. In this case, a connecting operation of an electric wiring to the individual injectors has been annoying and the structure has been complicated. In order to eliminate such drawbacks, there has been proposed a connector block which has connector parts for electrical connection to the injectors integrally made of synthetic resin material in a unit block. Japanese Publication No. JP-A-6-10789 of an examined patent application discloses one example of such structures. This type of the connector block has a fuel passage which is also formed integrally so as to distribute fuel to the respective injectors.

However, it has been pointed out that in such a connector block as the fuel passage is also incorporated inside the block, molding errors are likely to occur at a portion to be the fuel passage. This is because the connector block will be long-sized in a direction of arrangement of the cylinders, and accordingly, a core for molding the fuel passage will become also long-sized. Moreover, some of the fuel passages are of a closed structure at its rear end, and in this case, the core must be necessarily of a cantilever structure. For this reason, when the core receives an injecting pressure at the molding, the core tends to cause a positional displacement. Under such a situation, it has been likely to happen that the fuel passage is molded out of an accurate position.

When such the positional displacement as described above has happened, a uniform thickness of a wall of the fuel passage in a circumferential direction cannot be attained, but a deviation of thickness will be formed in a part of the wall. This means that cooling speed cannot be constant in a circumferential direction when a molded product is cooled after taken out from the molds. Accordingly, rate of shrinkage will be uneven in a circumferential direction of the fuel passage, and the whole block will be deflected. Further, in many cases busbars as the electric wiring are also incorporated in the injectors. In such cases too, a structural deviation of the wall thickness tends to happen, and voids or sink marks are likely to be created.

As a countermeasure to solve such problems, it has been considered that the core is retained by means of support pins projected from the metal molds and abutted against the core. However, in this case, there will be created through holes communicating with the fuel passage in the block, and the through holes must be closed by some sealing means. This leads to new problems such as addition of working steps and security of the seal, and cannot be said as an effective measure.

SUMMARY OF THE INVENTION

The invention has been developed in order to solve the above described problems, and it is an object of the invention to provide a connector block for injectors which has a high grade of molding quality.

In order to attain the above described object, according to a first aspect of the invention, there is provided is a connector block for injectors which comprises a block body made of synthetic resin material and provided with a plurality of injector mounting parts which are arranged at a determined interval in a longitudinal direction, a wiring part for electric power feed to the injectors, and a fuel supply part formed in the block body in a longitudinal direction and adapted to distribute fuel to the injectors, characterized in that the block body is molded in a state where the fuel supply part which has been molded separately therefrom is embedded inside.

According to a second aspect of the invention, there is provided a connector block for injectors as defined in the first aspect of the invention, characterized in that the fuel supply part is in a tubular shape including a fuel passage inside, and is further provided, at an outer face thereof, with positioning means to position the block body with respect to metal molds for molding the block body.

According to a third aspect of the invention, there is provided a connector block for injectors as defined in the first aspect of the invention, characterized in that the fuel supply part is made of metal.

According to the first aspect of the invention, the connector block is molded by placing the fuel supply part which has been previously prepared into the metal molds, and thereafter, filling a resin in the molds. Even though the molded product (the connector block) taken out from the metal molds should be deviated in the wall thickness, the fuel supply part placed inside will serve as the core member when the molded product is cooled and can effectively resist against the deflection.

The idea of providing the positioning means for the fuel supply part on the metal molds is by no means denied by the first aspect of the invention. Even in case where such positioning means are provided on the metal molds, traces of the positioning means extracted after the molding will only allow an outer face of the fuel supply part to be exposed, but will not create such through holes reaching an interior of the fuel supply part as in the conventional case, thus eliminating a necessity of sealing.

According to the second aspect of the inventions the fuel supply part is placed in position in the metal molds by the aid of the positioning means, and therefore the positional displacement will not occur even with the injecting pressure of the resin. As described, the fuel supply part will be molded at the accurate position, and the molding precision and molding quality will be enhanced.

Further, the fuel supply part made of metal as in the third aspect of the invention can surely resist against the injecting pressure of the resin, and the deflection will be more reliably prevented.

DETAILED DESCRIPTION OF THE PREFERRED EMBODIMENTS

Figure 1:
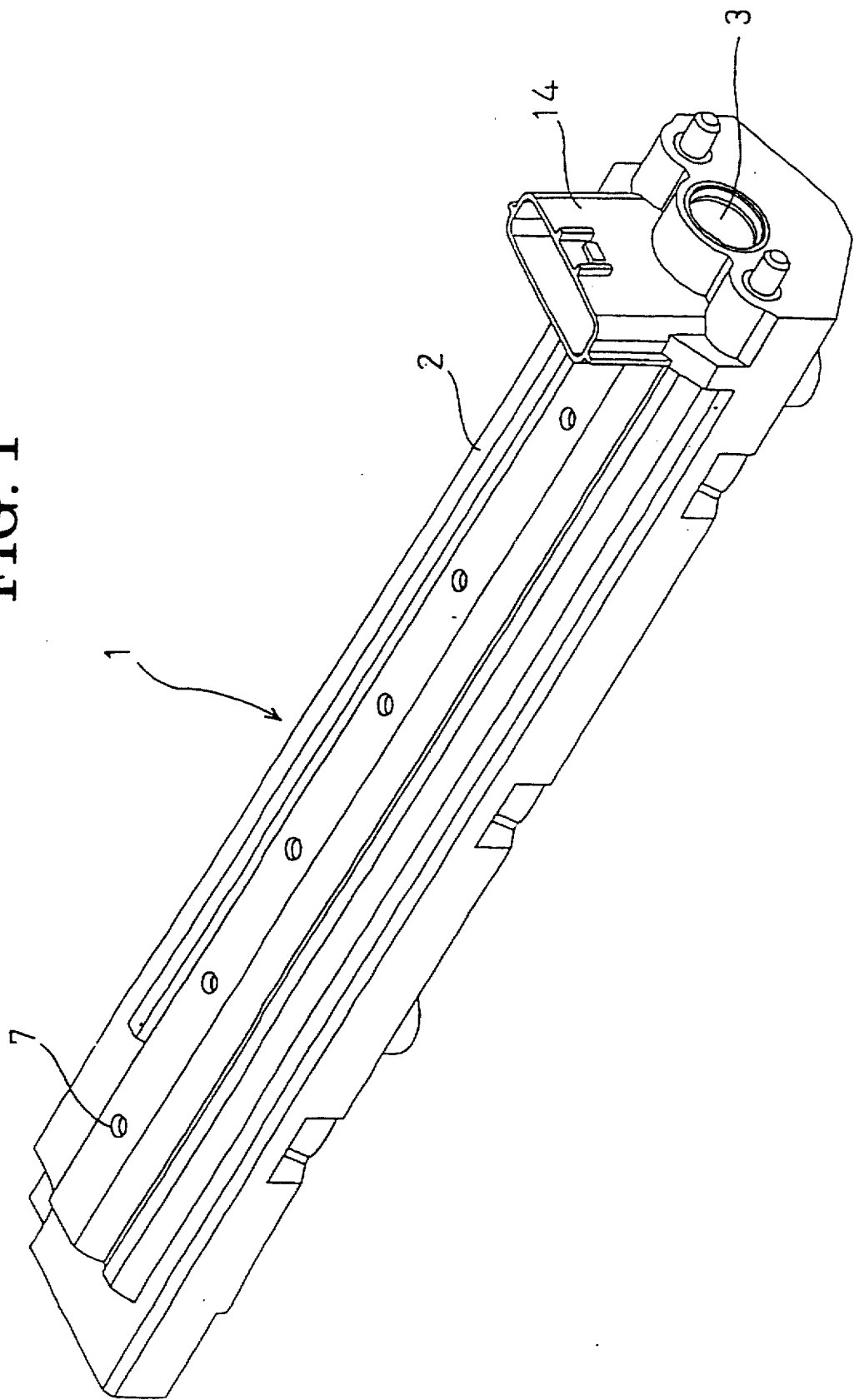
FIG. 1 is a perspective view of an entire connector block.
Figure 2:
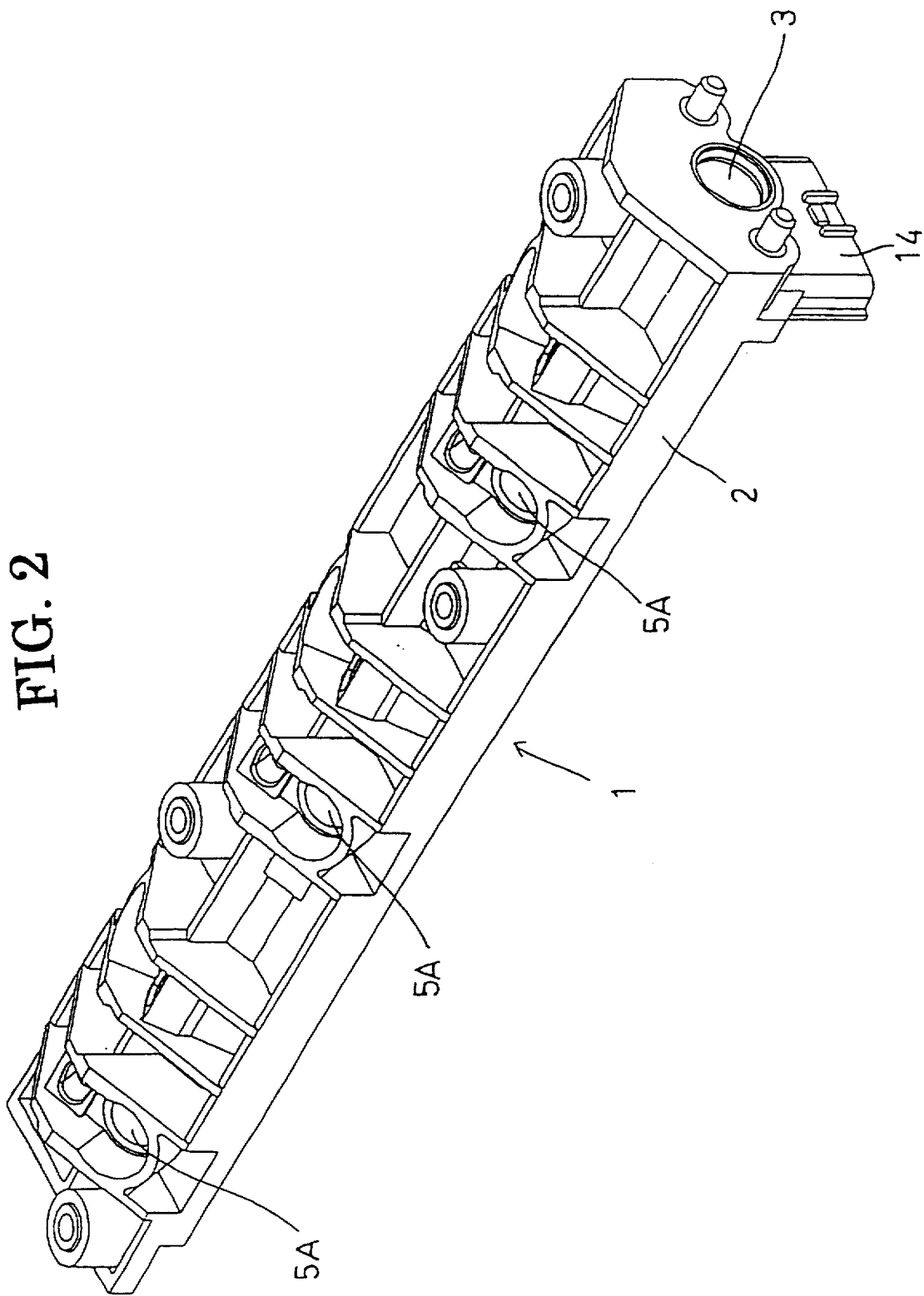
FIG. 2 is a perspective view of the connector block as viewed from a bottom side.

Now, a preferred embodiment according to the invention will be described referring to the drawings. In FIG. 1, reference numeral 1 represents an entire connector block for injectors which will be described in this embodiment referring to a type to be employed for a V-type six cylinder engine of an automobile. The connector block 1 has a block body 2 which is molded of a heat resistive reinforced hard resin or the like (glass impregnated polyphenylenesulfide, for example). At an end face of the block body 2, is exposed an open end of a fuel passage 3 at an upper central position as shown in FIG. 1, which can be connected to a feed pipe from a fuel pump.

Figure 4:
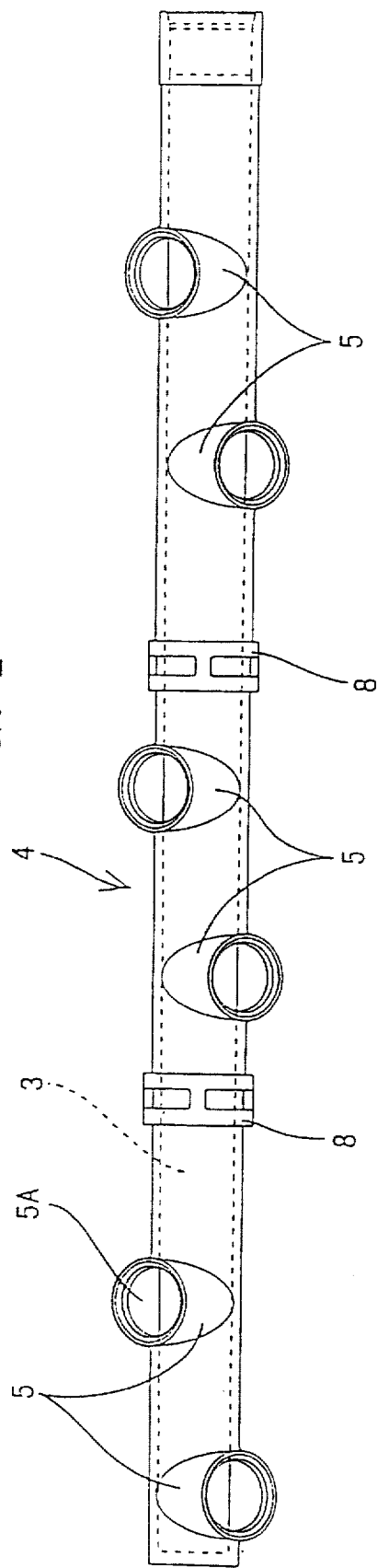
FIG. 4 is a front view of the fuel rail.
Figure 5:
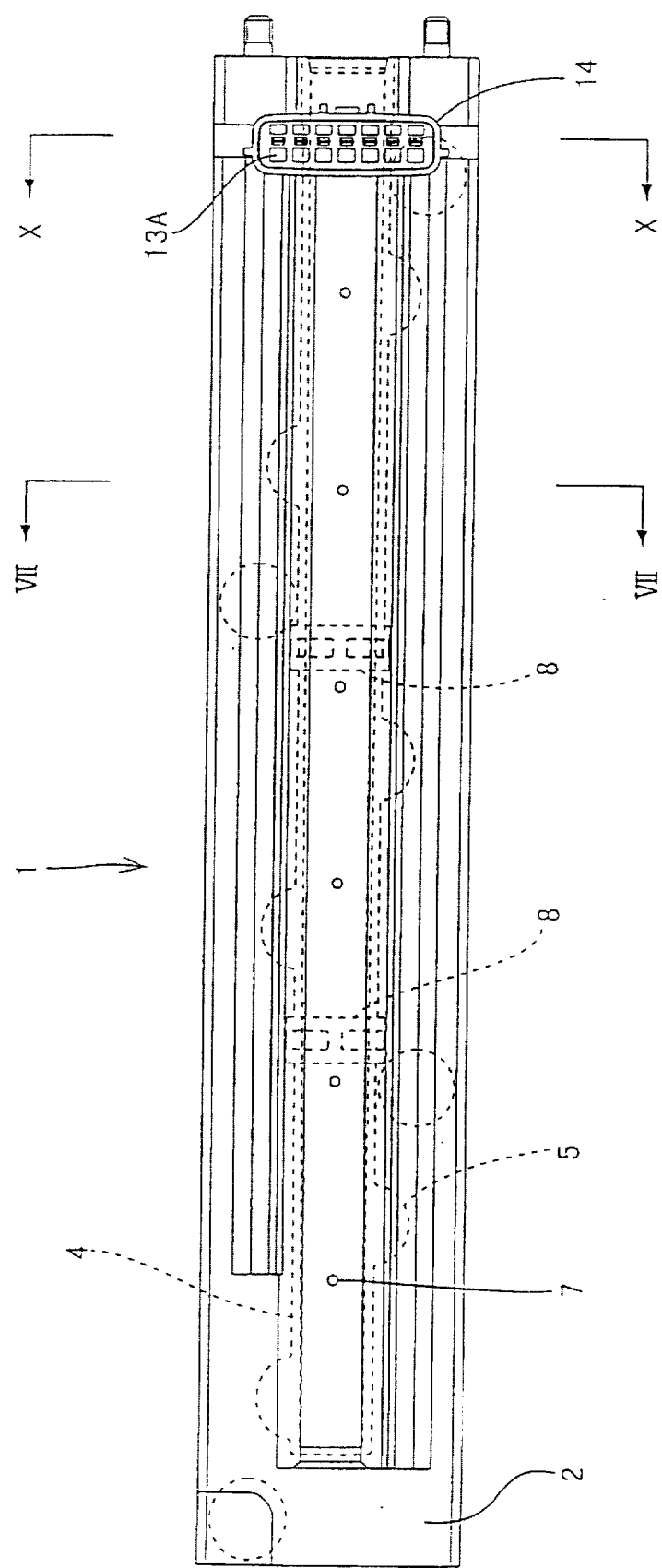
FIG. 5 is a plan view of the connector block.
Figure 6:
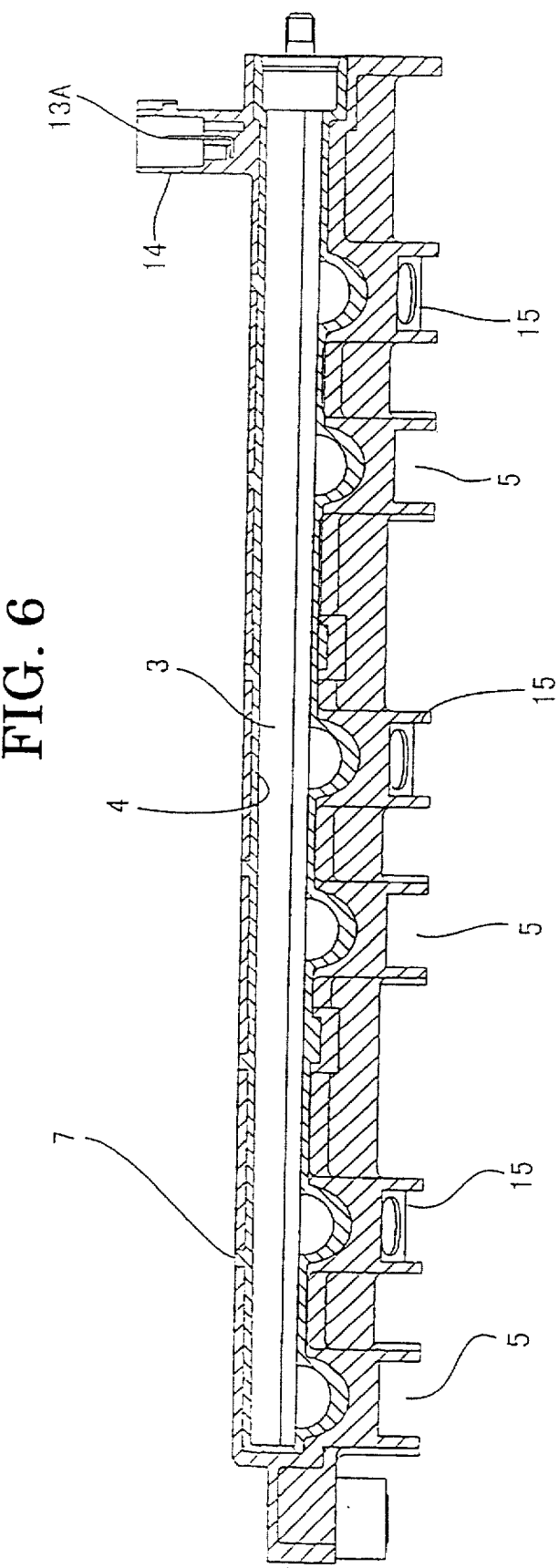
FIG. 6 is a sectional front view of the connector block.

The above described fuel passage 3 is composed of a fuel rail 4 (a fuel supply part) as shown in FIG. 4. The fuel rail 4 is molded prior to molding of the block body 2 and integrally molded of the heat resistive reinforced hard resin or the like of the same material as the block body 2 in this embodiment. The fuel rail 4 is in a substantially tubular shape having a length extending along a substantially whole length of the block body 2. In the fuel rail 4 is formed the above described fuel passage 3 along an axis thereof, and a rear end of the fuel passage 3 is closed. On an outer face of the fuel rail 4 are provided injector mounting parts 5 corresponding to air intake manifolds of the respective cylinders of the engine (not shown). The injector mounting parts 5 project in a form of a short cylinder and communicate with the fuel passage 3 with their ports (mounting ports 5A) formed staggeredly to be directed diagonally outwardly. The injectors which are not shown are adapted to be connected to the mounting ports 5A respectively.

Figure 7:
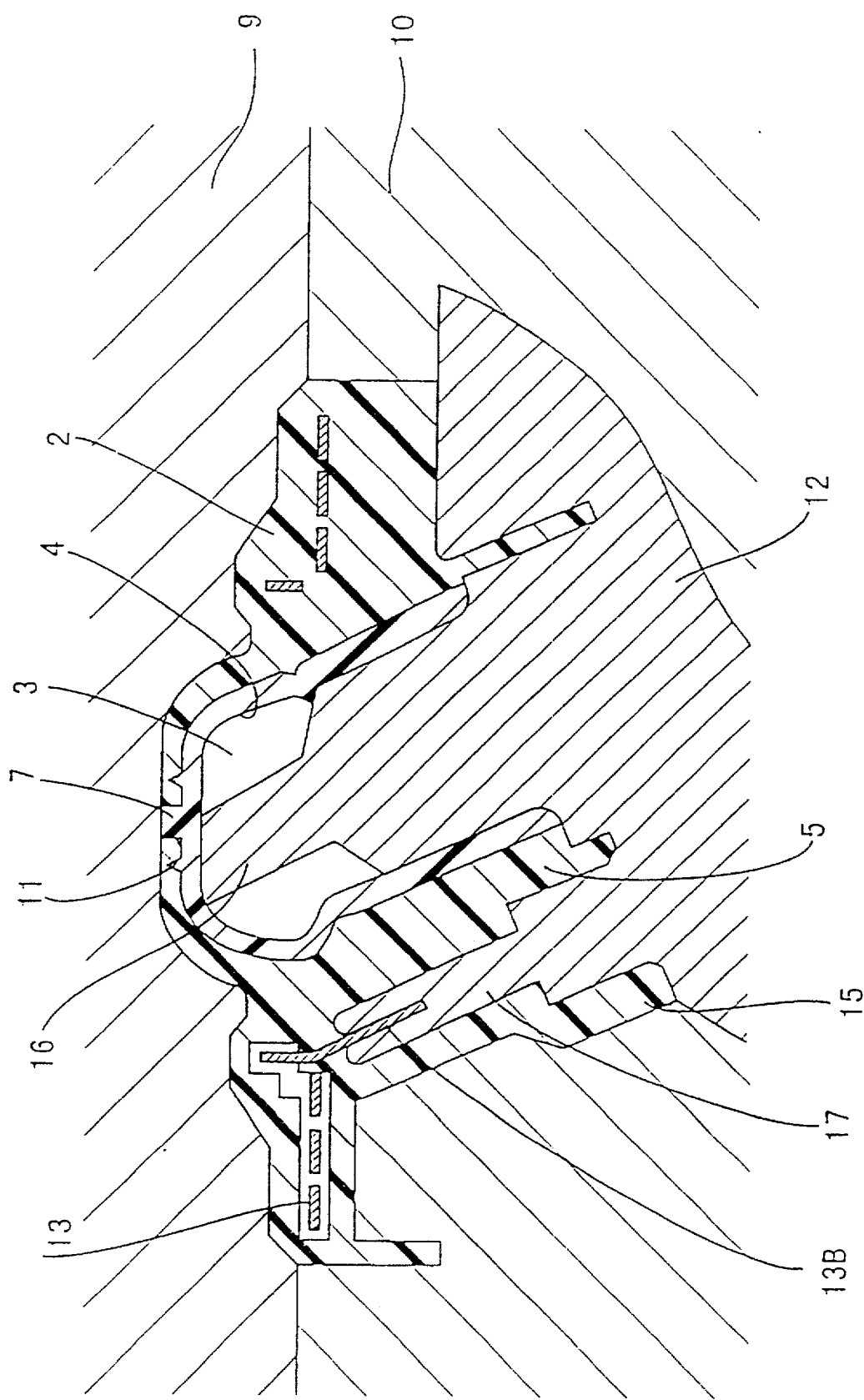
FIG. 7 is a cross sectional view taken along a line VII—VII in FIG. 5 and showing a state of molding.
Figure 8:
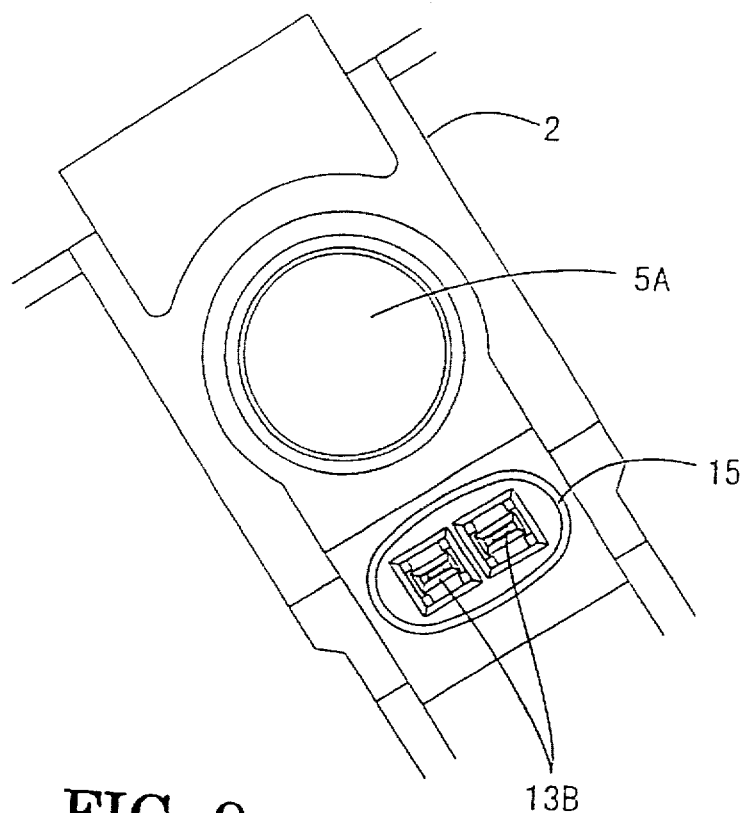
FIG. 8 is a front view showing an area around an injector mounting part.
Figure 9:
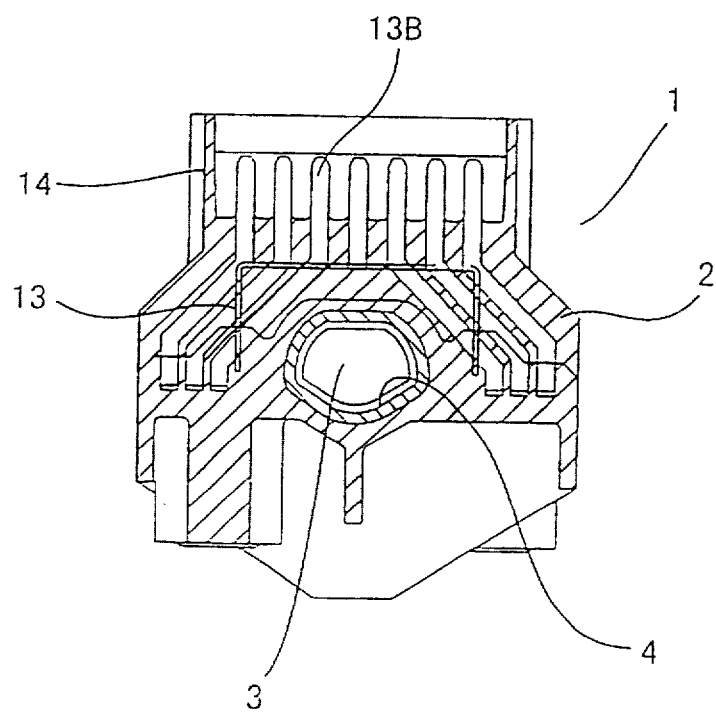
FIG. 9 is a cross sectional view taken along a line X—X in FIG. 5.

The fuel rail 4 has a flat face 6 on its upper face in a longitudinal direction and a plurality of positioning projections 7 arranged at an appropriate interval on the flat face 6. The positioning projections 7 are abutted against an inner wall face of a molding space which is formed between metal molds 9, 10 when molding the block body 2, and serve to retain the fuel rail 4 in position. As shown in FIG. 7, around each of the positioning projections 7 is provided an annular seal rib 11 which projects concentrically in an upright form and acts as a simple seal surrounding the positioning projection 7.

As shown in FIG. 4, the fuel rail 4 is provided with annular hook portions 8 at two intermediate positions along an outer peripheral face of the fuel rail 4. The purpose of providing the two hook portions 8 is as follows: When the fuel rail 4 itself is molded, a core 12 is employed between the metal molds 9, 10 in order to mold the fuel passage 3. When this core 12 is removed after the molding is finished, the removing action can be smoothly conducted by hooking an appropriate jig on these hook portions 8.

Figure 3:
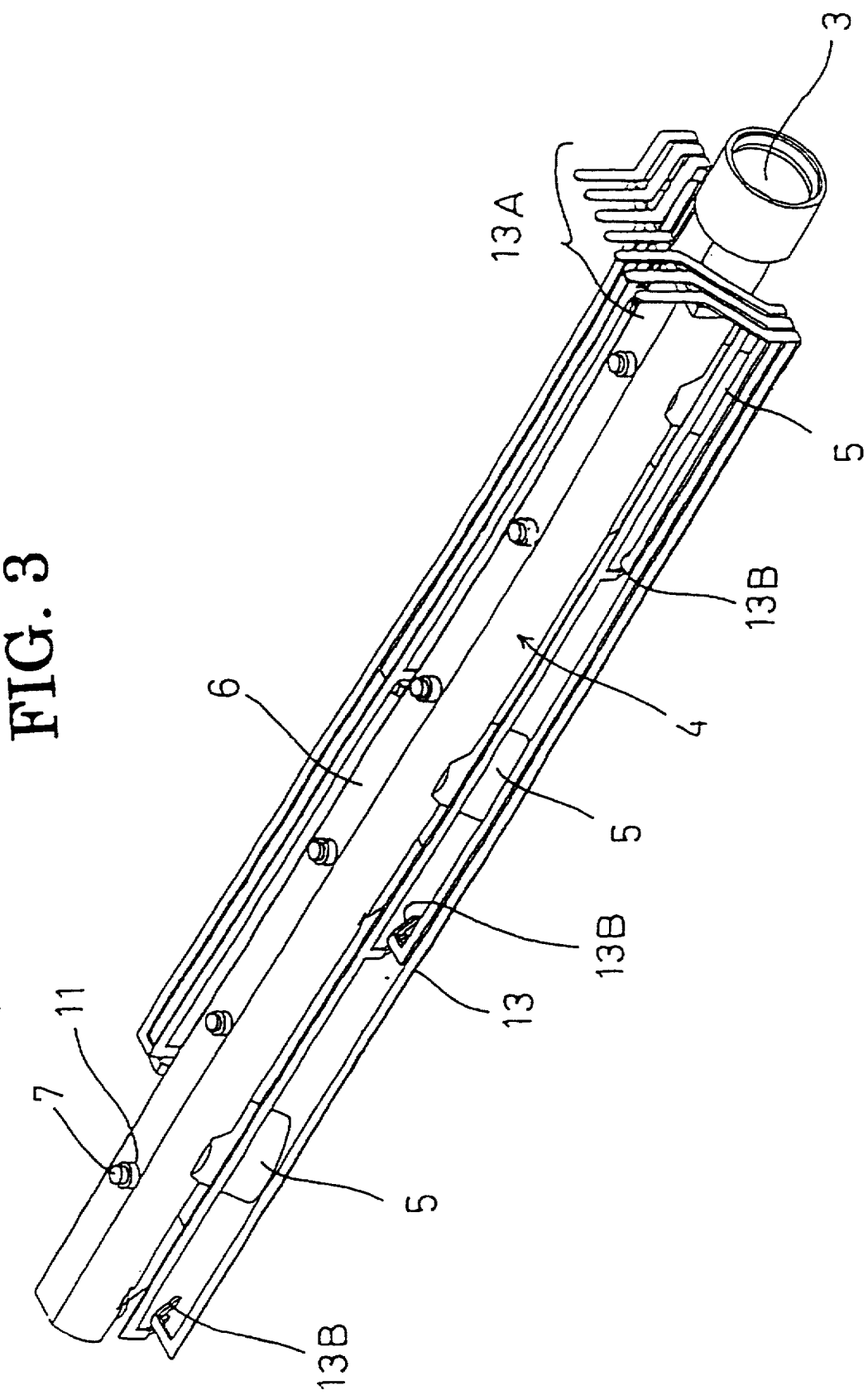
FIG. 3 is a perspective view of a fuel rail showing an arrangement of busbars provided thereon.

The block body 2 is obtained by a secondary molding after the fuel rail 4 has been molded at a first molding. A plurality of busbars 13 for electric power feed to the injectors are also embedded in the block body 2 in addition to the fuel rail 4. As shown in FIG. 3, seven busbars 13 in total are arranged on both sides of the fuel rail 4 in a longitudinal direction. Respective one ends of the busbars 13 are vertically bent and bundled at an inlet of the fuel passage 3 (at a right side end in FIG. 3) to form a tab group 13A to be connected to the connector which will be described below. Electric power feeding terminals 13B to be connected to solenoids of the respective injectors are formed at the other ends or at intermediate positions of the respective busbars 13.

The above described tab group 13A is contained in a laterally arranged manner inside a hood part 14 which is provided in an upright form on an upper face of the block body 2 at a position close to its end. A connector connected to a control system which is not shown can be engaged with this hood part 14. Through this engagement, the tab group 13A is connected to a group of mating terminals. Meanwhile, the electric power feeding terminals 13B are contained in distributing connectors 15 which are respectively provided adjacent to the injector mounting parts 5. Through the engagement of the distributing connectors 15 with the connectors of the injectors, the terminals at both sides can be interconnected.

Molding of the block body 2 will be now described (see FIG. 7). The busbars 13 are set in the lower mold 10, and the fuel rail 4 is set on the core 12 which is retractably provided in the lower mold 10. The core 12 is so constructed that it has a first molding part 16 adapted to be tightly inserted into the injector mounting parts 5 at the corresponding positions, and a second molding part 17 which can mold the distributing connectors 15 and can avoid an interference with the electric power feeding terminals 13B.

Then, an upper mold 9 is closed with respect to the lower mold 10 to form the molding space between the molds 9, 10 in a state where the fuel rail 4 is retained in the space. By filling the above described resin material into the molding space, the desired block body 2 having the fuel rail 4 and the busbars 13 embedded therein can be obtained. Since the positioning projections 7 of the fuel rail 4 are abutted against an inner wall of the molding space in the upper mold 9, and inner walls of the injector mounting parts 5 are pressed by a distal end of the first molding part 16, a stable posture of the fuel rail 4 in a longitudinal direction can be secured. Therefore, even though the fuel rail 4 receives the injecting pressure of the resin, the fuel rail 4 will not be displaced. Thus, the entire connector block 1 can be accurately molded. With this arrangement, such unbalanced wall thickness as in the conventional connector block will not occur, and the problem of deflection will be avoided before it happens. Even though the displacement of the fuel rail 4 has happened, the fuel rail 4 contained inside will function as the core member, and in any case, the problem of deflection will be avoided.

In the connector block 1 which has been removed after molded, top faces of the positioning projections 7 are exposed on the flat face 6 in flush therewith. For this reason, it is feared that water may intrude through border areas around the positioning projections 7. However, in this embodiment, the annular seal ribs 11 are provided on the fuel rail 4 around the positioning projections 7 so as to surround the positioning projections 7, and therefore, a further intrusion of water will be prevented.

As described above, according to the instant embodiment, the pre-molded fuel rail 4 is set in position between the metal molds and then in this state, the secondary molding is conducted. Therefore, the positional displacement of the fuel rail 4 rarely happens even in case where the fuel rail 4 receives the injecting pressure at the molding, enabling the connector block 1 to be accurately molded. Because the unbalanced wall thickness will not occur around the fuel passage 3 and hence, the deflection and deformation will not happen, quality of the molded product can be enhanced.

It should be noted that various modifications are available according to the invention, and the following modifications are also within a technical scope of the invention:

(1) The positioning means with respect to the metal molds are provided on the fuel rail 4 in this invention, but it is also possible to provide the positioning means on the metal molds.

(2) The fuel rail 4 may be molded not only of the resin material but also of metallic material.

What is claimed is:

1. A connector block for injectors, comprising:

an elongated block body made of synthetic resin material;

a plurality of injector mounting parts arranged on said block body at predetermined intervals in a longitudinal direction of said block body;

a wiring part disposed in said block body for electric power feed to said injectors;

a fuel supply part formed in said block body in the longitudinal direction and adapted to distribute fuel to the injectors; and said fuel supply part includes positioning projections along substantially the entire length of the fuel supply part to position said fuel supply part with respect to metal molds for molding said block body;

wherein said block body is molded in a state where said fuel supply part which has been molded separately therefrom is embedded inside.

2. A connector block for injectors as claimed in claim 1, wherein said fuel supply part is in a tubular shape including a fuel passage inside, and includes, at an outer face thereof, positioning projections to position said fuel supply part with respect to metal molds for molding said block body.

3. A connector block for injectors as claimed in claim 1, wherein said fuel supply part is made of metal.

* * * * *